United States Patent [19]

Battaglia

[11] Patent Number: 5,433,362
[45] Date of Patent: Jul. 18, 1995

[54] CARRYING CASE FOR ATTACHMENT TO VISOR

[76] Inventor: Gianpaolo Battaglia, Via Pacinotti 4, Romano D'Ezzelino, Vicenzo, Italy

[21] Appl. No.: 127,639

[22] Filed: Sep. 28, 1993

[30] Foreign Application Priority Data

May 14, 1993 [IT] Italy ................ VI93U0043

[51] Int. Cl.⁶ .................................... B60R 7/05
[52] U.S. Cl. ........................ 224/312; 224/151; 224/224; 224/253; 224/901; 383/4; 383/24
[58] Field of Search ............ 224/901, 312, 277, 151, 224/253, 219, 222, 224, 228; 384/4, 22, 24

[56] References Cited

U.S. PATENT DOCUMENTS

| | | | |
|---|---|---|---|
| 2,486,096 | 10/1949 | Axford et al. | 224/312 |
| 2,631,632 | 3/1953 | Leachman | 224/151 |
| 2,673,670 | 3/1954 | Steele | 224/312 |
| 2,707,072 | 4/1955 | Sims | 224/312 |
| 2,931,114 | 4/1960 | Peterson | 224/312 |
| 3,016,262 | 1/1962 | Hunt | 224/312 |
| 3,026,999 | 3/1962 | Constantino | 224/277 |
| 4,535,878 | 8/1985 | Grahl | 383/4 |
| 4,844,311 | 7/1989 | Kalen | 224/312 |
| 4,881,684 | 11/1989 | Chinman | 224/901 |
| 4,905,881 | 3/1990 | Graber | 224/222 |
| 4,958,759 | 9/1990 | Jarvis | 224/151 |
| 5,009,347 | 4/1991 | Phelps | 224/901 |
| 5,020,711 | 6/1991 | Kelley | 224/901 |
| 5,170,917 | 12/1992 | Tourigny | 224/901 |
| 5,329,947 | 7/1994 | Shikler | 224/312 |
| 5,337,933 | 8/1994 | Nunez | 224/224 |

FOREIGN PATENT DOCUMENTS

195588 6/1957 Austria ................ 224/312

*Primary Examiner*—Henry J. Recla
*Assistant Examiner*—Gregory M. Vidovich
*Attorney, Agent, or Firm*—Notaro & Michalos

[57] ABSTRACT

A carrying case for use on a vehicle sun visor and for use away from the sun visor has a rectangular case body having a periphery. The body is foldable in half at a centerline for dividing the front and the back sides into two halves each. A zipper is connected around the periphery of the case body for closing the case body when the case body is folded with the two halves of the front side facing each other. A pair of spaced straddling straps are connected to one of the halves of the front side for fixing the case body to a sun visor. A zipper pocket is on the back side of the case body as is a belt loop. A tapered flap is connected to one of the halves of the front side of the case body for holding sunglasses and a document pocket is connected on the other of the halves of the front side with a change pocket connected over the document pocket. The change pocket has a zipper extending substantially parallel to the centerline and near a middle of the change pocket so that portions of the change pocket extend on both sides of the zipper of the change pocket.

8 Claims, 2 Drawing Sheets

CARRYING CASE FOR ATTACHMENT TO VISOR

SUMMARY OF THE INVENTION

This is a case specially conceived to be applied to a motor vehicle's sun visor and foreseen to contain various objects which are utilizable by the driver when or when not driving.

The case has various pockets also supplied with zippers and can, for example, contain motor vehicle documents, money and change, sunglasses, combs, pens, pencils, and other items.

A main feature of the case is that it "covers" the sun visor and can be fastened to it by strip tape, or by straps, elastics, buttons or the like.

Therefore, the conceived case, can easily be taken off the sun visor and utilized by being carried on the owner's belt.

According to the invention, an original object carrying case is created for use on the inside of motor vehicles. It is formed by two parts, foldable facing each other and usable to cover normal sun visors located on the inside of the windshield.

Depending on if the sun visors are fixed and therefore only maneuvered frontally, or if they are unhookable for a rotation of approximately 90°, the conceived case is applied from underneath or above, "straddling" the sun visor.

A main feature of this case is the fact that it can be put in place and taken off based upon necessity of the sun visor and that its fastening can be made by hook and loop type strip tape known by the trademark VELCRO, traditional straps, adjustable elastics, button or the like.

This case can also be used on an owner's belt by simply doubling it over on itself.

DESCRIPTION OF THE PREFERRED EMBODIMENT

Figure 2:
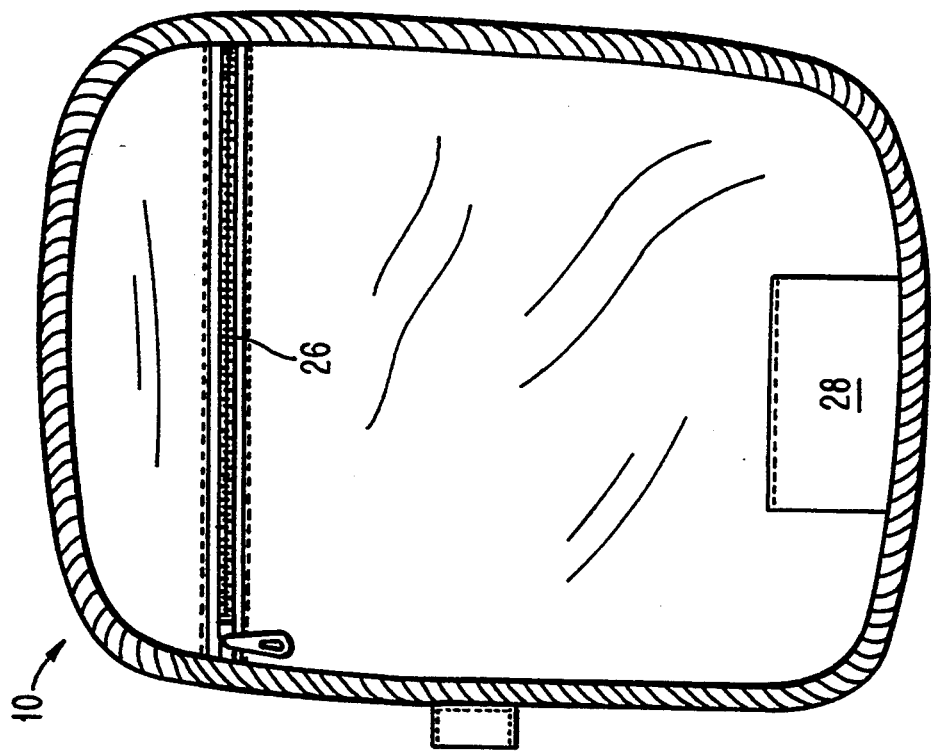
FIG. 2 represents the opposite side.
Figure 1:
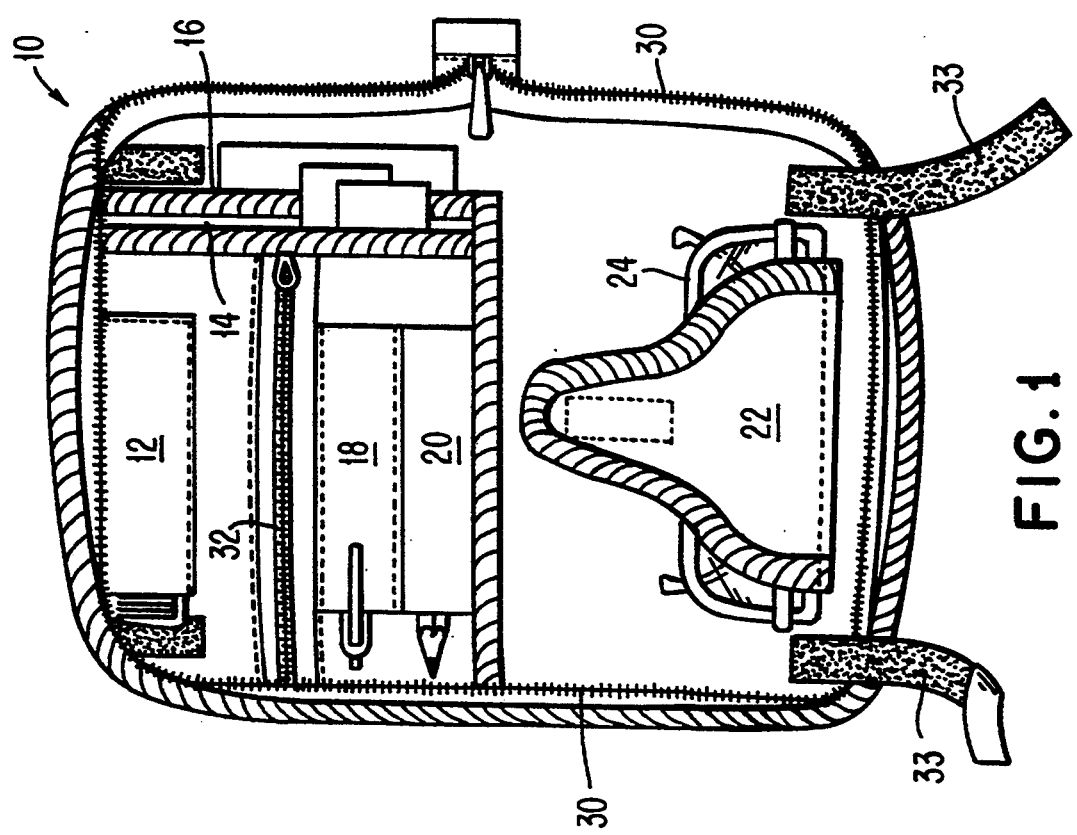
FIG. 1 shows the conceived case frontally and open.

As shown in FIGS. 1 and 2, the conceived case is internally composed of a certain number of pockets, also supplied with zippers.

Case 10 consists of the following: pocket 12 for a comb, pockets 14 and 16 as document holders or money holders; sleeves 18 and 20 to contain pens and pencils.

The other half of the case can include a "slide space" defined by a tapered flap 22 to hold eyeglasses or sunglasses 24.

FIG. 2 represents the reverse side of the case when open. It has a zip pocket 26 for holding change or documents and a loop 28 for the belt to which the case can be attached and carried by the owner. In this case, the object carrier is closed by the outside zipper 30 (FIG. 1) which extends around the periphery of the rectangular case body, before being attached to a pants belt or a belt to be worn around the waist.

The zipper 32 in FIG. 1 divides a big internal pocket over pockets 14, 16, in half in which one can place change, pay toll tickets or other loose items.

Figure 3:
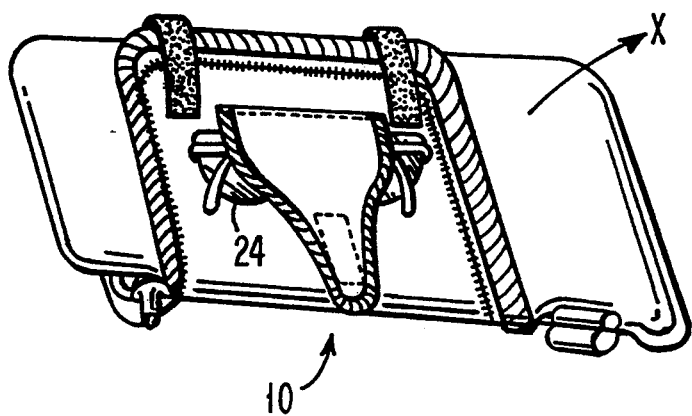
FIG. 3 shows the case as applied to the sun visor in a raised position.

The case is applied by "straddling" it across the sun visor as indicated in FIG. 3 in one way or another according to the user's preference with the back side of FIG. 2, facing the visor.

Figure 4:
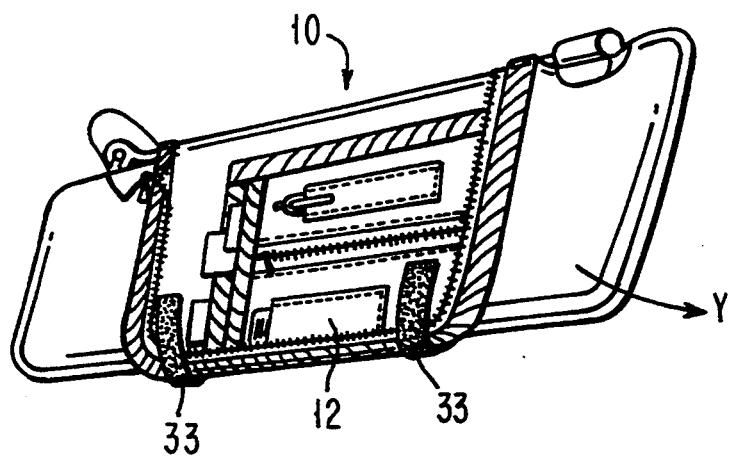
FIG. 4 represents the sun visor in a lowered position.

In FIG. 3, with the sun visor raised (arrow X), the case offers eyeglasses. Meanwhile, with the sun visor lowered (FIG. 4 arrow Y) all of the other objects listed above are accessible.

Figure 5:
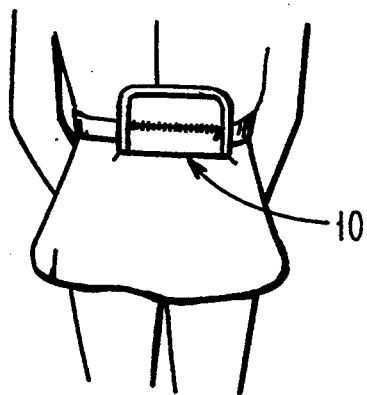
FIG. 5 shows the case as applied to the owner's belt.

FIG. 5 shows how the case, closed on itself that is with the halves of the back surface of FIG. 2, now on the outside of the case, using the outer zipper 30, can be carried at the waist using a belt.

As shown in FIGS. 1 and 2, the carrying case is rectangular with a periphery on which zipper 30 is mounted so that the carrying case can be folded either backwards or forwards on its centerline to accommodate the positions of FIGS. 3 or 5. The tapered flap 22 for the sunglasses as clearly shown in FIG. 1, is attached to one-half of the front face of the carrying case, with the broad part of the taper attached near the periphery and parallel to the centerline, and the narrow part of the taper toward the centerline.

Application of the case on the sun visor can be made even if it is a fixed type. In this case, pass "strip tape" or "straddling" straps at 33 in FIG. 1, above the sun visor as shown in FIG. 3. Utilization may seem upside down but there is no disadvantage to the user. Even zipper 32 which divides the above-mentioned pocket in two and is parallel to the centerline, allows the use of the other half in which one can automatically collect change which cannot fall out.

The conceived case can adopt any kind of fastening system such as hook and loop type strip tape, straps with buckles, elastics, buttons or other. However, in a way which always allows for easy removal for belt use by the owner.

From what is described and illustrated, the novelty and usefulness of the conceived case are evident, especially considering its utilization by "straddling" or "covering" the motor vehicle's sun visor, or on the owner's belt, given its easy removal.

I claim:

1. A carrying case for use on a vehicle sun visor and for use away from the sun visor, comprising:

a rectangular case body having a periphery, a front side and a back side, the case being foldable in half at a centerline thereof for dividing the front and the back sides into two halves each, the case body being foldable with the two halves of the front side facing each other when using the carrying case away from the sun visor, and with the two halves of the back side facing each other for attachment to the sun visor;

a zipper connected around the periphery of the case body for closing the case body to form a closed pouch when the case body is folded with the two halves of the front side facing each other;

a pair of spaced straddling straps having first fastening means connected to one of the halves of the front side and second fastening means connected to the other of said halves of the front side for mating with said first fastening means for fixing the case body to the sun visor with the halves of the front side facing away from the sun visor and the halves of the back side facing toward the sun visor;

a zipper pocket on the back side of the case body;

a belt loop on the back side of the case body;

a tapered flap connected to one of the halves of the front side of the case body for holding sunglasses;

a first document pocket connected on the other of the halves of the front side; and a change pocket connected to a front portion of the document pocket and having a zippered opening extending substantially parallel to the centerline and near a middle of the change pocket so that portions of the change pocket extend on both sides of the zipper of the change pocket.

2. A carrying case according to claim 1, including a comb pocket on the change pocket on one side of the zippered opening and at least one pen sleeve on the change pocket on an opposite side of the zippered opening.

3. A carrying case according to claim 2, including a second document pocket which is smaller than the first document pocket positioned between the first document pocket and the change pocket.

4. A carrying case according to claim 3, wherein the zipper pocket on the back side of the case body is on one of the halves of the back side and the belt loop is on the other of the halves of the back side.

5. A carrying case according to claim 3, wherein the comb pocket and the pen sleeve extend substantially parallel to the centerline, the first and second document pockets having openings extending substantially transversely to the centerline.

6. A carrying case according to claim 3, wherein the first and second fastening means are of a hook and loop-type fasteners.

7. A carrying case according to claim 6, including a second pen sleeve extending parallel to and adjacent said at least one pen sleeve on the change pocket.

8. A carrying according to claim 7, wherein the tapered flap has a wide portion connected to one of the halves of the front face of the case body adjacent and parallel to the periphery of the case body and parallel to the centerline, the tapered flap having a narrow end extending toward and being adjacent the centerline.

* * * * *